(12) United States Patent
Gmirya

(10) Patent No.: US 12,292,084 B2
(45) Date of Patent: May 6, 2025

(54) BEARING ANTI-CREEP INTERFACE

(71) Applicant: Lockheed Martin Corporation, Bethesda, MD (US)

(72) Inventor: Yuriy Gmirya, Woodbridge, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 48 days.

(21) Appl. No.: 18/344,045

(22) Filed: Jun. 29, 2023

(65) Prior Publication Data

US 2025/0002136 A1    Jan. 2, 2025

(51) Int. Cl.
| | |
|---|---|
| *F16C 19/26* | (2006.01) |
| *B64C 11/02* | (2006.01) |
| *F16C 33/58* | (2006.01) |
| *F16C 33/60* | (2006.01) |
| *F16C 35/063* | (2006.01) |

(52) U.S. Cl.
CPC ............ *F16C 33/586* (2013.01); *B64C 11/02* (2013.01); *F16C 19/26* (2013.01); *F16C 33/60* (2013.01); *F16C 35/063* (2013.01); *F16C 2226/12* (2013.01); *F16C 2226/80* (2013.01); *F16C 2326/43* (2013.01)

(58) Field of Classification Search
CPC ........ F16C 19/52; F16C 33/586; F16C 33/60; F16C 2226/12; F16C 2226/80; F16C 2326/43; F16C 35/063; B64C 11/02
See application file for complete search history.

(56) References Cited

U.S. PATENT DOCUMENTS

| | | | |
|---|---|---|---|
| 2,435,067 A | | 1/1948 | Beatty |
| 4,460,058 A | * | 7/1984 | Welschof ............... F16C 33/586 464/182 |
| 9,004,215 B2 | * | 4/2015 | Hofmann ................ F16D 1/076 180/260 |
| 10,247,245 B2 | * | 4/2019 | Uhrick .................... F16D 3/223 |
| 10,577,090 B2 | | 3/2020 | Lauder |
| 10,788,088 B2 | | 9/2020 | Olson et al. |
| 10,981,660 B2 | | 4/2021 | Mackin |
| 11,041,525 B1 | | 6/2021 | Mueller et al. |
| 2011/0206310 A1 | | 8/2011 | Ventzke |

* cited by examiner

*Primary Examiner* — Phillip A Johnson

(74) *Attorney, Agent, or Firm* — Michael Best & Friedrich LLP

(57) ABSTRACT

A bearing anti-creep interface having a drive shaft, a bearing race, and a hub. The drive shaft extends along a rotational axis. The bearing race has an inner surface press-fit onto the drive shaft and an axial end surface defining a bearing race interface surface. The hub has an inner surface rotationally coupled to the drive shaft and an axial end surface defining a hub interface surface. The hub interface surface is in contact with the bearing race interface surface to form an interlocking joint. The interlocking joint is configured to transfer rotational creep force of the bearing race about the rotational axis and relative to the drive shaft into an axial pressure force applied to the hub in a direction parallel with the rotational axis.

20 Claims, 7 Drawing Sheets

BEARING ANTI-CREEP INTERFACE

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC. The Government has certain rights in the invention.

FIELD OF INVENTION

Embodiments described herein relate to a bearing anti-creep interface and, in particular, to a bearing anti-creep interface for use in an aircraft.

BACKGROUND

Known rotor systems include bearings races and hubs that are press-fit onto shafts. Bearing race creep phenomena is undesirable rotational motion of bearing races relative to shafts. Bearing creep causes fretting and wear of the shaft surface, which may cause significant damage to compromise the shaft and potentially result in catastrophic failure. Known methods of preventing bearing creep by providing wear resistant coating on bearing races and/or rotor shafts may not withstand creep forces and may wedge broken coating between the bearing race and the shaft, resulting in significant damage to the bearing race and/or shaft. Known methods of preventing bearing creep by including slots and tabs are not effective at addressing bearing race creep phenomena. Such slots and tabs present high stress concentrations which may unpredictably fail while high loads generated by bearing creep are applied to the slots and tabs.

SUMMARY

Embodiments described herein provide a bearing anti-creep interface comprising a drive shaft, a bearing race, and a hub. The drive shaft extends along a rotational axis. The bearing race has an inner surface press-fit onto the drive shaft and an axial end surface defining a bearing race interface surface. The hub has an inner surface rotationally coupled to the drive shaft and an axial end surface defining a hub interface surface. The hub interface surface is in contact with the bearing race interface surface to form an interlocking joint. The interlocking joint is configured to transfer rotational creep force of the bearing race about the rotational axis and relative to the drive shaft into an axial pressure force applied to the hub in a directional parallel with the rotational axis.

Embodiments described herein provide an aircraft comprising an airframe, a power source, a gearbox, a bearing race, a rotor hub, and a plurality of blades. The power source is configured to generate power. The gearbox is coupled to the power source and a drive shaft, the drive shaft extending along and rotatable about a rotational axis according to the generated power transmitted through the power source. The bearing race has a bearing race inner surface secured to the drive shaft by a press-fit. The bearing race further includes a bearing race interface surface with a transition portion that is angled with respect to a horizontal reference line extending perpendicular to the rotational axis. The rotor hub has a hub inner surface secured to the drive shaft by intermeshing splines. The rotor hub has a hub interface surface with a hub transition portion complementary to the transition portion of the bearing race. The plurality of blades are coupled to the rotor hub and are configured to produce at least one of thrust or lift according to a rotation of the drive shaft. The bearing race interface surface and the hub interface surface engage one another to form an interlocking joint configured to counteract rotational creep force of the bearing race relative to the drive shaft.

Embodiments described herein provide a bearing race comprising a body. The body is generally annularly shaped about a rotational axis, and includes an annular inner surface, an opposite annular outer surface, a first axial end surface, and an opposite second axial end surface. At least one of the annular inner surface, the first axial end surface, and the second axial end surface is shaped with at least one peak and at least one valley configured to form a portion of an interlockingjoint.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings.

Figure 1:
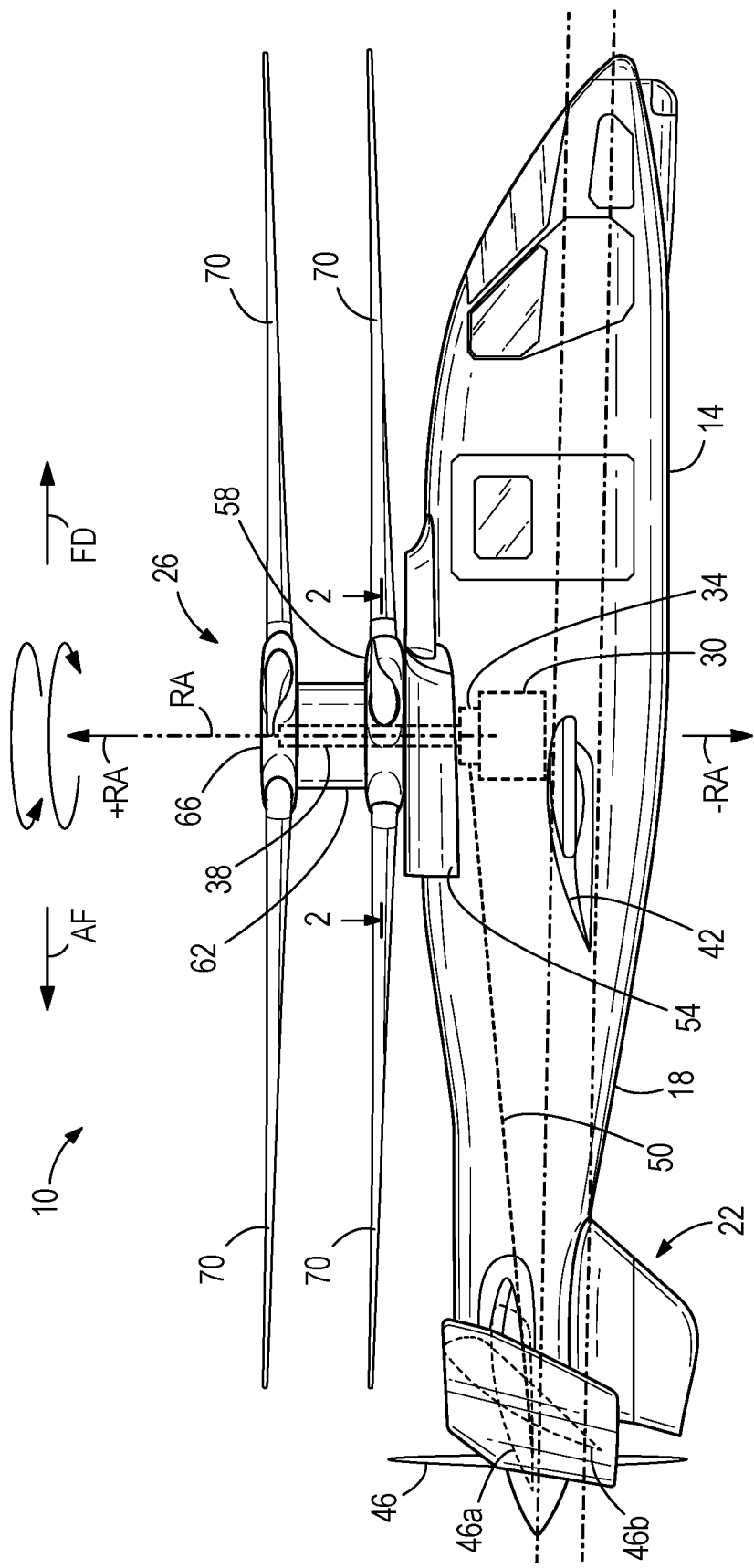
FIG. 1 depicts a schematic of a rotary wing aircraft according to an exemplary embodiment.

FIG. 1 depicts an exemplary embodiment of a rotary wing, vertical takeoff and land (VTOL) aircraft 10. The aircraft 10 includes an airframe 14 having a body 18 and a tail 22. The tail 22 extends from the body 18. A dual, counter rotating, coaxial main rotor assembly 26 is coupled to the body 18 of the airframe 14. As will be described in detail below, the main rotor assembly 26 rotates about a rotational axis RA. The rotor assembly 26 may be used in other types of aircraft 10 such as non-vertical takeoff and land (non-VTOL) aircraft 10. For example, the rotor assembly 26 may be used in single main rotor helicopters, tandem rotor helicopters including offset rotor assemblies, tandem intermeshing rotor helicopters including overlapping rotor assemblies, coaxial helicopters including a plurality of rotary wings aligned along a common axis, and the like. The rotor assembly 26 may also be used for other transport vehicles such as automobiles, boats and the like. The rotor assembly 26 may also be used in other contexts (e.g., motors) not relating to transport vehicles.

In an exemplary embodiment (the VTOL aircraft 10 of FIG. 1), the airframe 14 includes two seats for flight crew (e.g., pilot and co-pilot) and six seats for passengers. However, an airframe 14 having another configuration (e.g., single seat airframes, airframes configured for transporting both flight crew and passengers) is within the scope of the present disclosure. The main rotor assembly 26 is driven by a power source 30. The power source 30 may be, for example, one or more engines. The power source 30 may transmit on-board electrical energy (e.g., from a battery or other electrical energy source) or chemical energy (e.g., from fuel or another chemical energy source) into mechanical energy (i.e., torque).

The power source 30 is capable of transmitting energy to the main rotor assembly 26. The power source 30 is coupled to the main rotor assembly 26 via a gearbox 34 and a drive shaft 38. The power source 30 is coupled to the gearbox 34, and the gearbox 34 is coupled to the drive shaft 38, which is coupled to the rotor assembly 26. Upon activation of the power source 30, the power source 30 generates power that is transmitted to the rotor assembly 26 through the gearbox 34 and the drive shaft 38. Accordingly, the rotor assembly 26 can utilize the mechanical energy generated by the power source 30 to generate at least one of thrust and lift forces to counteract and/or overcome drag and weight forces acting upon the aircraft 10. Accordingly, the aircraft 10 can hover in place or be maneuvered to a desired position.

In some embodiments, the aircraft 10 may include a wing 42 in addition to the rotor assembly 26 and an auxiliary propeller 46. The illustrated wing 42 includes a cross-sectional profile in the shape of an airfoil. The airfoil shape, size, and length of the wing 42 may be selected to optimize flight of the aircraft 10.

The illustrated aircraft 10 may further include the auxiliary propeller 46. The illustrated auxiliary propeller 46 is positioned on the tail 22 and is spaced from the body 18. The auxiliary propeller 46 may be coupled to the gearbox 34. In other embodiments, the auxiliary propeller 46 may be coupled to a dedicated power source and a dedicated gearbox. The illustrated auxiliary propeller 46 is coupled to the gearbox 34 via an auxiliary drive shaft 50. The power source 30 may simultaneously provide power (e.g., mechanical energy) to the rotor assembly 26 and the auxiliary propeller 46 via the gearbox 34. In other modes of operation (e.g., while hovering in place), the gearbox 34 may drive only one of the rotor assembly 26 and the auxiliary propeller 46.

With continued reference to FIG. 1, the rotor assembly 26 includes a pylon fairing 54, a lower rotor hub 58 (e.g., a first hub fairing), a shaft fairing 62, and an upper rotor hub 66 (e.g., a second hub fairing). In the illustrated embodiment, each of the lower rotor hub 58 and the upper rotor hub 66 includes a plurality of blades 70 coupled thereto. The lower rotor hub 58 and the upper rotor hub 66 may each be coupled to the drive shaft 38 for rotation therewith upon excitation of the power source 30. The lower rotor hub 58 and the upper rotor hub 66 are each aligned along the rotational axis RA, and are each configured to rotate about the rotational axis RA. The size (e.g., diameter), shape (e.g., pitch, airfoil), and quantity of blades 70 coupled to each rotor hub 58, 66 may be selected to optimize flight of the aircraft 10. In some embodiments, the upper rotor hub 66 and the lower rotor hub 58 may be driven in the same direction. In other embodiments, the upper rotor hub 66 and the lower rotor hub 58 may be driven in opposite directions (e.g., the upper rotor hub 66 and the lower rotor hub 58 may counter-rotating).

Figure 2:
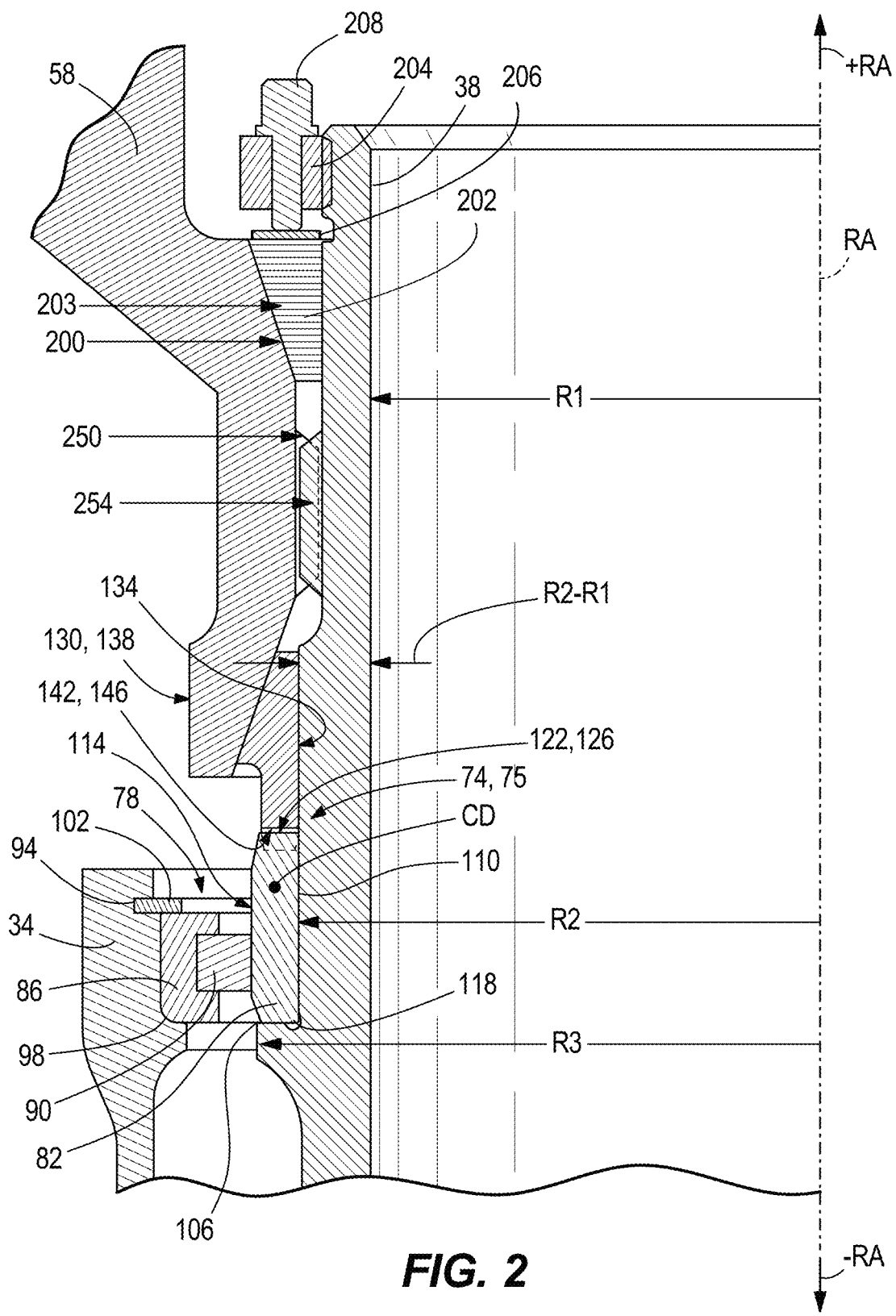
FIG. 2 is a cross-sectional view of a bearing anti-creep interface of the rotary wing aircraft of FIG. 1.

FIG. 2 depicts a cross-sectional view of the rotor assembly 26 through an interlocking joint 74 (e.g., which functions as a bearing anti-creep interface 75) between the lower rotor hub 58 and the drive shaft 38. The interlocking joint 74 is formed between interconnecting surfaces of the lower rotor hub 58, a bearing 78, and the drive shaft 38. The bearing 78 includes two bearing races 82, 86, and at least one rolling element 90 configured to permit rotation of the bearing race 82 relative to the bearing race 86. The bearing race 82 is positioned radially closer to a rotational axis RA of the rotor assembly 26 when compared to the bearing race 86. As such, the bearing race 82 may be referred to as an inner bearing race, and the bearing race 86 may be referred to as an outer bearing race. The bearing 78 may include any number of any configuration of rolling elements 90 between the races 82, 86 thereof. For example, the bearing 78 may include rolling elements 90 shaped as balls, cylindrical rollers, or the like.

The outer bearing race 86 is secured to a fixed component fixed relative to the airframe 14. In the illustrated embodiment, the outer bearing race 86 is secured to the gearbox 34. However, in other embodiments, other structure or combination of structures fixed relative to the airframe 14 may support the outer bearing race 86. For example, the outer bearing race 86 may be supported by (e.g., installed in) a lower rotor shaft (e.g., of the power source 30, not shown) of the rotor assembly 26, with the lower rotor shaft being oriented in a coaxial aircraft configuration in which the lower rotor shaft is coaxial with the rotational axis RA of the rotor assembly 26. The illustrated gearbox 34 includes a cutout 94 and a shoulder 98. The cutout 94 is dimensioned to receive a retaining element 102, and the outer bearing race 86 is dimensioned to be axially held between the retaining element 102 and the shoulder 98. In other embodiments, the outer bearing race 86 may be axially retained relative to the gearbox 34 (or the airframe 14 in general) by similar or different structures.

With continued reference to FIG. 2, the drive shaft 38 may be generally annularly (e.g., hollow cylindrically) shaped with respect to the rotational axis RA. The drive shaft 38 includes an inner radius R1 and an outer radius R2 nominally greater than the inner radius R1. The drive shaft 38 includes a thickness R2−R1 perpendicularly to the rotational axis RA. The drive shaft 38 further includes a shoulder 106 having a shoulder radius R3 nominally greater than the outer radius R2 of the remainder of the drive shaft 38.

The inner race 82 of the bearing 78 is dimensioned to be secured to the drive shaft 38. The inner race 82 includes a radial inner surface 110, a radial outer surface 114, a first axial end surface 118, and an opposite second axial end surface 122. The radial inner surface 110 is dimensioned nominally lesser than the outer radius R2 of the drive shaft 38 such that the inner race 82 of the bearing 78 may be pressed (e.g., press fit) onto the drive shaft 38. The radial outer surface 114 is dimensioned to interact with the rolling element(s) 90. The first axial end surface 118 is dimensioned with a radial thickness generally corresponding with a radial thickness of the shoulder 106 (e.g., a difference between the shoulder radius R3 and the outer radius R2) such that the shoulder 106 provides an axial stop for the first axial end surface 118 of the inner race 82. As will be described in detail below, the second axial end surface 122 of the inner race 82 defines a bearing race interface surface 126 which functions as a part of the interlocking joint 74 in securing the lower rotor hub 58 to the drive shaft 38 and inhibiting creep of the inner race 82 relative to the drive shaft 38.

Figure 4:
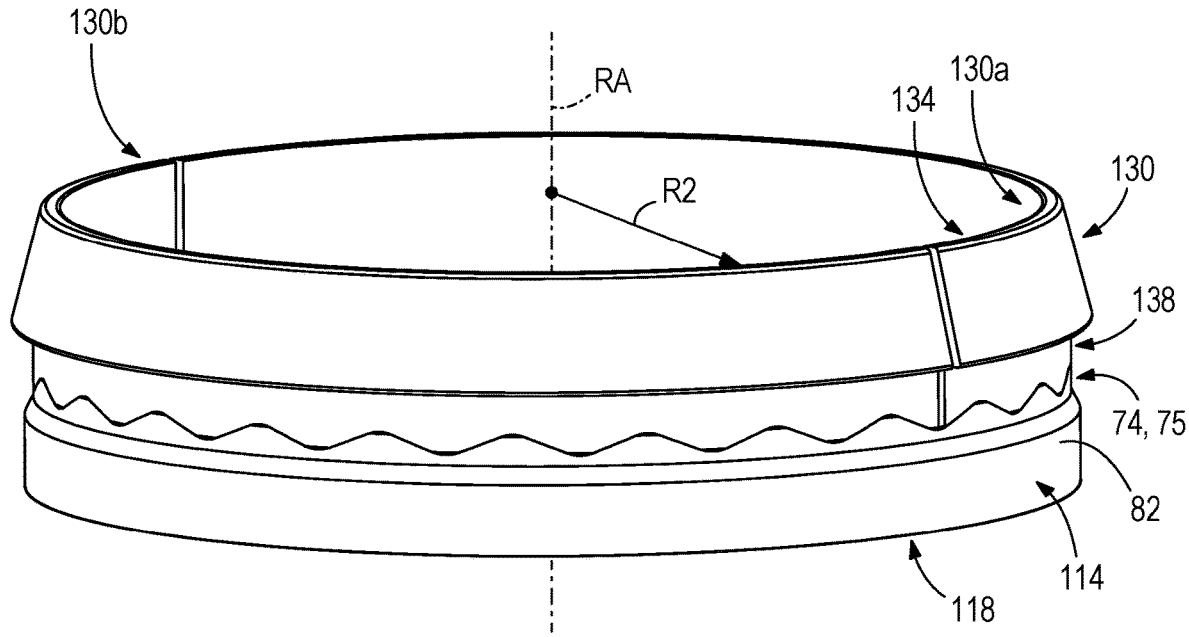
FIG. 4 is a perspective view of the interlocking joint of the bearing anti-creep interface of FIG. 2.
Figure 5:
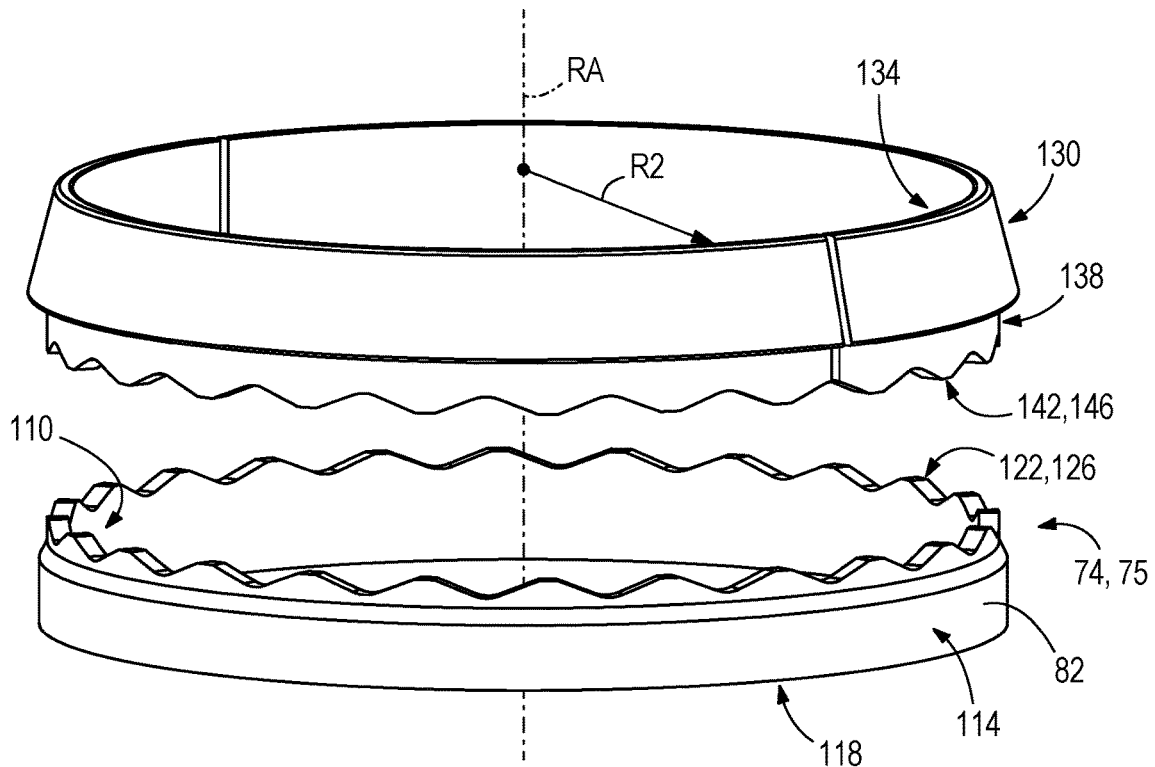
FIG. 5 is an exploded view of the interlocking joint of the bearing anti-creep interface of FIG. 2.

The lower rotor hub 58 is dimensioned to be secured to the drive shaft 38 and the inner race 82. The lower rotor hub 58 includes a low cone portion 130, which includes a radial inner surface 134 dimensioned similarly to the outer radius R2 of the drive shaft 38 such that the low cone portion 130 may be slid onto the drive shaft 38. In the illustrated embodiment, the radial inner surface 134 is dimensioned nominally greater than the outer radius R2 of the drive shaft 38 such that the low cone portion 130 may loosely slide (e.g., translate) into a position circumscribing the drive shaft 38 above the inner race 82 (e.g., as illustrated in FIG. 2). In some embodiments, the low cone portion 130 may be translated in the downward direction-RA to this position. In other embodiments, as best illustrated in FIGS. 4 and 5, the low cone portion 130 may comprise multiple (e.g., two) distinct pieces 130*a*, 130*b*. In the illustrated embodiment, the pieces 130*a*, 130*b* of the low cone portion 130 are moved into the position circumscribing the drive shaft 38 above the inner race 82 by movement thereof in a radially inwardly extending direction extending towards the rotational axis RA. Other structural arrangements of the low cone portion 130 and direction of movement of the low cone portion 130 into position relative to the drive shaft 38 are possible. The low cone portion 130 of the lower rotor hub 58 further includes a radial outer surface 138 opposite the radial inner surface 134. Finally, the low cone portion 130 of the lower rotor hub 58 further includes an axial end surface 142 dimensioned with a radial thickness generally corresponding with a radial thickness of the second axial end surface 122 of the inner race 82. The axial end surface 142 of the low cone portion 130 defines a hub interface surface 146 which functions as a part of the interlocking joint 74 in securing the lower rotor hub 58 to the drive shaft 38 and inhibiting creep of the inner race 82 relative to the drive shaft 38.

With continued reference to FIG. 2, the radial inner surface 134 of the lower rotor hub 58 includes a hub spline 250, and the drive shaft 38 includes a shaft spline 254. The hub spline 250 intermeshes with the shaft spline 254 to transmit torque from the drive shaft 38 to the lower rotor hub 58. The lower rotor hub 58 includes a plurality of hub splines 250 circumferentially spaced about the rotational axis RA. The hub splines 250 extend radially inwardly from the radial inner surface 134 of the lower rotor hub 58 towards the rotational axis RA. The drive shaft 38 includes a plurality of shaft splines 254. The shaft spline or splines 254 extend radially outwardly from the drive shaft 38 in a direction extending away from the rotational axis RA. At least a quantity, cross-sectional shape, axial length (e.g., along the rotational axis RA), and circumferential width of hub splines 250 present on the lower rotor hub 58 and of the shaft splines 254 present on the drive shaft 38 permit intermeshing and corresponding torque transmission between the hub splines 250 with the shaft splines 254. Size and shape of the hub splines 250 and shaft splines 254 may be optimized (e.g., depending on expected loads) for light weight high torque transmission between the drive shaft 38 and lower rotor hub 58. The hub splines 250 and shaft splines 254 thus rotationally couple the inner surface 134 of the lower rotor hub 58 to the drive shaft 38.

Figure 3:
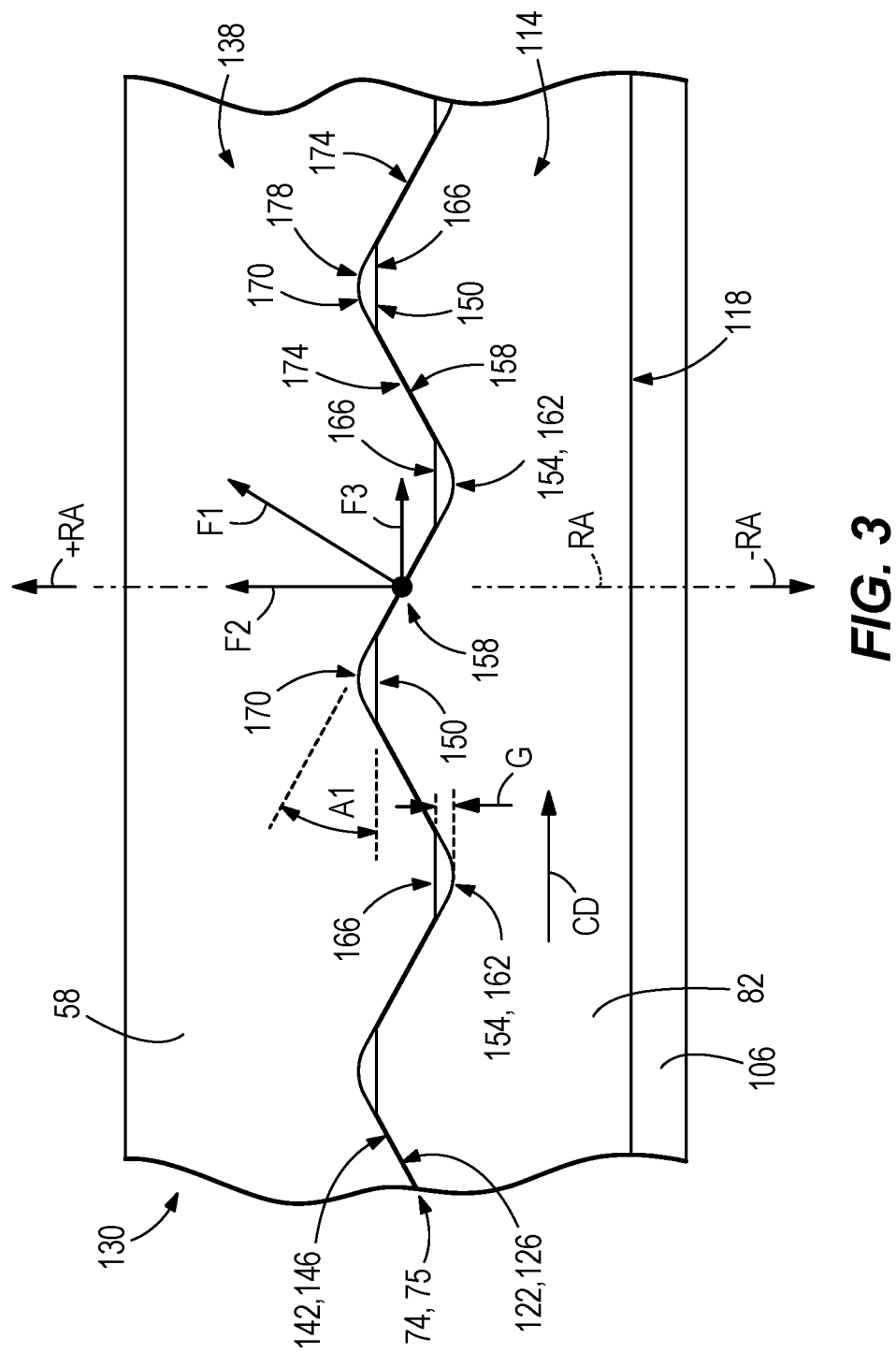
FIG. 3 is a side view of an interlocking joint of the bearing anti-creep interface of FIG. 2.

FIG. 3 depicts a side view of the interlocking joint 74 and bearing anti-creep interface 75 between the inner race 82 and the low cone portion 130 (i.e., the lower rotor hub 58). The interlocking joint 74 and bearing anti-creep interface 75 between the inner race 82 and the low cone portion 130 are further illustrated in FIGS. 4-5. The bearing race interface surface 126 includes a plurality of peaks 150, a plurality of valleys 154, and a plurality of transition portions 158 between adjacent peaks 150 and valleys 154. The peaks 150 and valleys 154 have variable height (e.g., in a direction parallel to the rotational axis RA) with respect to a body of the inner race 82. The peaks 150 are spaced a greater distance from the first axial end surface 118 when compared to the valleys 154. In the embodiment illustrated in FIG. 3, each of the peaks 150 and each of the valleys 154 includes rounded edges 162 that facilitate meshing with the hub interface surface 146 of the low cone portion 130. The rounded edges 162 are variable in height in a direction parallel with the rotational axis RA.

The transition portions 158 are generally planar and extend between the peaks 150 and valleys 154 of the inner race 82. The transition portions 158 are oriented along an angle A1 relative to the rotational axis RA. The angle A1, as viewed from the radial outer surface 114 of the inner race 82, is angled relative to a horizontal reference plane perpendicular to the rotational axis RA. The illustrated angle A1 extends in an upward direction +RA and represents the orientation of the transition portion 158 between one of the peaks 150 and an adjacent valley 154 (e.g., on a right-hand side of the peak 150). In the illustrated embodiment, another corresponding angle A1 extends in an opposite, downward direction-RA, and represents the orientation of the transition portion 158 between the same peak 150 and an adjacent valley 154 on the opposite side of the peak 150 (e.g., on a left-hand side of the peak 150). In other words, transition portions 158 flank opposite circumferential sides of the peaks 150 and provide bidirectional contact surface area for interaction with transition portions 174 of the low cone portion 130. The bidirectional contact surface is configured to urge the low cone portion 130 into engagement with the inner race 82. The bidirectional contact surface may oppose rotational creep force in either a first rotational direction (e.g., clockwise) about the rotational axis or an opposite second rotational direction (e.g., counter clockwise) about the rotational axis. In the illustrated embodiment, the angle A1 is approximately 30 degrees. However, in other embodiments, the angle A1 may be greater than 0 degrees and lesser than 90 degrees. In other embodiments, the angle A1 may be between or equal to 1 degree and 45 degrees. In other embodiments, the angle A1 may be between or equal to 5 degrees and 40 degrees. Selection of the angle A1 may depend on expected creep force of the inner race 82, rotation speed of the drive shaft 38, and the like.

The hub interface surface 146 of the low cone portion 130 is dimensioned in correspondence with the bearing race interface surface 126. The hub interface surface 146 includes a plurality of peaks 166, a plurality of valleys 170, and a plurality of transition portions 174 between adjacent peaks 166 and valleys 170. The peaks 166 and valleys 170 have variable height (e.g., in a direction parallel to the rotational axis RA) with respect to a body of the low cone portion 130. The peaks 166 are provided at a lower axial position (e.g., further along a negative rotational axis −RA) when compared to the valleys 170. In other words, the valleys 170 are provided at a higher axial position (e.g., further along a positive rotational axis +RA) when compared to the peaks 166. In the embodiment illustrated in FIG. 3, each of the peaks 166 and each of the valleys 170 include rounded edges 178, which facilitate meshing with the bearing race interface surface 126 of the inner race 82. The rounded edges 178 are variable in height in a direction parallel with the rotational axis RA.

As described regarding the transition portions 158 of the inner race 82, the transition portions 174 of the low cone portion 130 are generally planar and extend between the peaks 166 and the valleys 170 of the low cone portion 130. The transition portions 174 of the low cone portion 130 also provide bidirectional contact surface area for interaction with the transition portions 158 of the inner race 82. In the illustrated embodiment, the entirety of the transition portions 174 are oriented along the angle A1 such that a large amount of surface area of the inner race 82 contacts the low cone portion 130.

In the illustrated embodiment, each of the peaks 150, 166 and each of the valleys 154, 170 are dimensioned generally similarly to one another. For example, each of the peaks 150, 166 and each of the valleys 154, 170 have generally the same height extending along a direction parallel with the rotational axis RA. In other embodiments, peaks 150, 166 and valleys 154, 170 may extend at differing heights relative to the rotational axis RA. In the illustrated embodiment, the inner race 82 and the low cone portion 130 have the same amount of peaks 150, 166 and the same amount of valleys 154, 170 with the peaks 150 of the inner race 82 engaging corresponding valleys 170 of the low cone portion 130, and vice versa. This presents a one-for-one relationship between one peak (e.g., one of the peaks 150) and one valley (e.g., one of the valleys 170). In other embodiments, ratios other than one-for-one peak to valley may be present. For example, one peak 150 may be provided for every two valleys 170, with the second valley 170 not receiving a corresponding peak 150. Ratios other than one-to-one ratios may provide lesser amounts of surface area for contact and transmission of creep force between the inner race 82 and the low cone portion 130.

However, the peaks 150, 166 and valleys 154, 170 of the inner race 82 and the low cone portion 130 slightly differ in the embodiment illustrated in FIG. 3. Each of the valleys 154, 170 includes a curved surface with variable height relative to the rotational axis RA (e.g., relative to a body of the bearing race 82). Each of the peaks 150, 166 are chamfered at their tip to provide an axial gap G between the peaks 150, 166 and the corresponding valleys 154, 170 (e.g., of the bearing race interface surface 126 and the hub interface surface 146). In other embodiments, only a limited number of peaks 150, 166 may be chamfered. Providing this chamfer at a tip of the peaks 150, 166 may promote full engagement between the inner race 82 and the low cone portion 130, and promote high amounts of surface contact area between the transition portions 158, 174. In other embodiments, the peaks 150, 166 may not be chamfered.

Figure 6:
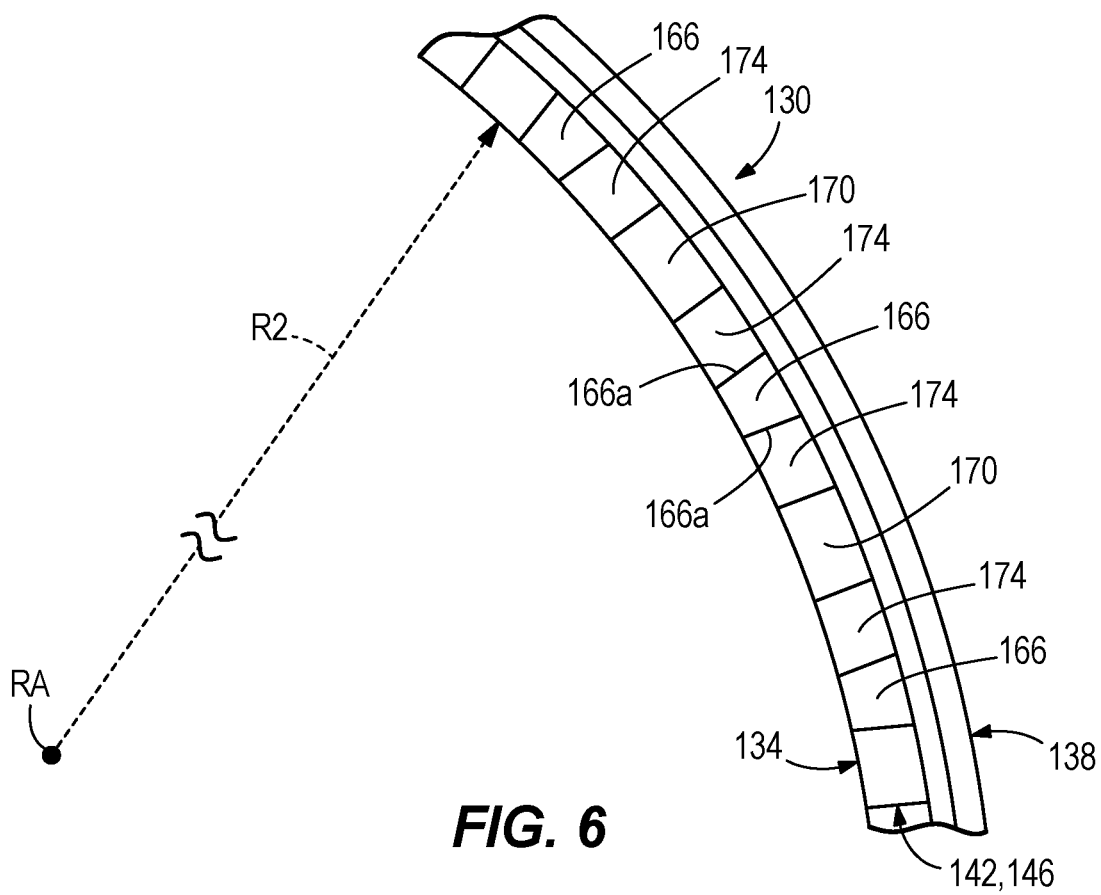
FIG. 6 is an end view of a rotor hub low cone of the bearing anti-creep interface of FIG. 2.
Figure 7:
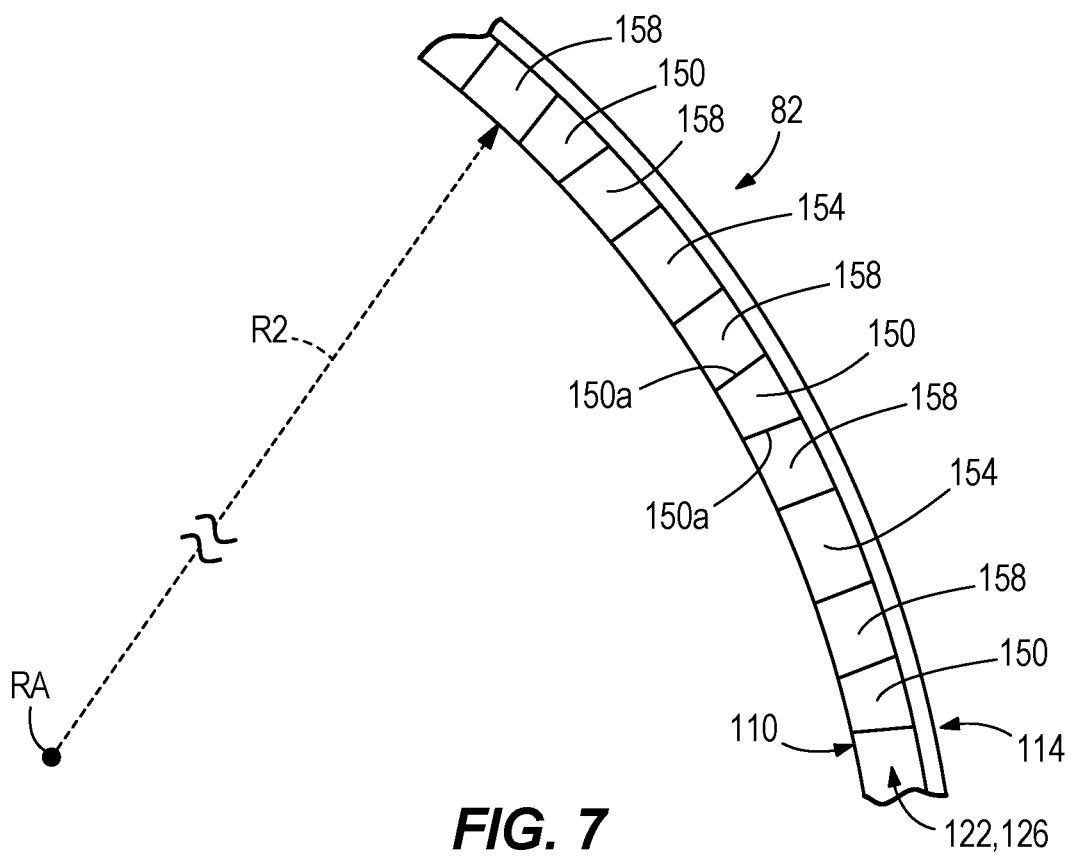
FIG. 7 is an end view of a bearing race of the bearing anti-creep interface of FIG. 2.

FIGS. 6 and 7 depict end views of the hub interface surface 146 and the bearing race interface surface 126, respectively. As described above, the hub interface surface 146 includes peaks 166 separated from valleys 170 in a circumferential direction about the rotational axis RA by the transition portions 174. FIGS. 6 and 7 depict orientations of the peaks 150, 166, valleys 154, 170, and transition portions 158, 174 relative to the rotational axis RA. Given the annular shapes of the inner race 82 and the low cone portion 130 relative to the rotational axis RA, the peaks 150, 166, valleys 154, 170, and transition portions 158, 174 are generally oriented in a radial direction towards the rotational axis RA. The peaks 150, 166 include edges 150a, 166a defined by the chamfer surfaces thereof. The edges 150a, 166a may be oriented radially in intersection with the rotational axis RA. The edges 150a, 166a may be oriented along secant lines not intersecting radially with the rotational axis RA. In the illustrated embodiments, the peaks 150, 166, valleys 154, 170, and transition portions 158, 174 are each generally directed entirely towards the rotational axis RA. In other embodiments, portions of, or subsets of peaks 150, 166, valleys 154, 170, and transition portions 158, 174 may be otherwise angled relative to the rotational axis RA as viewed from FIGS. 6 and 7.

In the illustrated embodiment, the peaks 150, 166, valleys 154, 170, and transition portions 158, 174 are repeated in a circumferential direction about the rotational axis RA along the entire periphery of the inner race 82 and low cone portion 130. In the illustrated embodiment, the peaks 150, 166, valleys 154, 170, and transition portions 158, 174 are circumferentially evenly spaced about the rotational axis RA. However, in other embodiments, any desired circumferential spacing may be used.

In the illustrated embodiment, twenty four peaks 150, 166, twenty four valleys 154, 170, and forty eight transition portions 158, 174 are provided on each of the inner race 82 and the low cone portion 130. In other embodiments, as little as one peak 150, 166, may be provided on one of the inner race 82 and the low cone portion, and as little as one valley 154, 170 may be provided on the other of the inner race 82 and the low cone portion 130. As little as two transition portions 158, 174 may be provided on each of the inner race 82 and the low cone portion 130. In such an embodiment, the inner race 82 and low cone portion 130 may include a planar portion extending generally perpendicularly from the rotational axis RA. In other embodiments, each of the inner race 82 and the low cone portion 130 may include one peak 150, 166 and one valley 154, 170. In other embodiments, each of the inner race 82 and the low cone portion 130 may include between two and one thousand peaks 150, 166 and between two and one thousand valleys 154, 170. For example, two peaks 150, 166 and two valleys 154, 170 may be provided on each of the inner race 82 and the low cone portion 130. In such an embodiment, the planar portion may provide circumferential spacing between the peaks 150, 166, valleys 154, 170, and transition portions 158, 174. Such a circumferential spacing element may lessen a quantity of peaks 150, 166, valleys 154, 170, and transition portions 158, 174, and decrease a contact surface area between the inner race 82 and the low cone portion 130. Height (along the rotational axis RA) and circumferential width (e.g., arc length about the rotational axis RA) of the peaks 150, 166, valleys 154, 170, and transition portions 158, 174, as influenced by the angle A1, may be selected based on expected loads on the inner race 82 and low cone portion 130, as well as other factors.

Referring to FIG. 2, the lower rotor hub 58 includes an angled inner surface 200 dimensioned to receive a cone portion 202 (i.e., an upper cone potion) of the lower rotor hub 58 radially between the angled inner surface 200 and the drive shaft 38. In the illustrated embodiment, the angled inner surface 200 is transverse to the rotational axis RA, and is angled with a lower portion of the angled inner surface 200 being closer to the rotational axis RA than an upper portion thereof (as viewed in FIG. 2). In the illustrated embodiment, the angled inner surface 200 is linear in cross-sectional shape; however, non-linear inner surfaces 200 are possible.

The drive shaft 38 further includes a connecting surface 204, and the rotor assembly 26 further includes a thrust plate 206 and a fastener 208 which together secure an axial position of the lower rotor hub 58 relative to the drive shaft 38. The fastener 208 is configured to be tightened to the connecting surface 204 to secure the cone portion 202 and thus the lower rotor hub 58 to the drive shaft 38 during hub installation. In some embodiments, the drive shaft 38 includes a plurality of connecting surfaces 204 arranged circumferentially (e.g., evenly circumferentially) about the rotational axis RA. In such arrangements, the fastener 208 may be one of a plurality of fasteners 208 each engaging a corresponding one of the connecting surfaces 204. The fasteners 208 may be tightened in any pattern (e.g., a "star" or "crisscross" tightening pattern) to promote even transmission of force through each of the fasteners 208. In the illustrated embodiment, the connecting surface 204 may be a nut. In the illustrated embodiment, the fastener 208 may be a bolt, which is pre-installed (i.e., pre-loaded) onto the connecting surface 204 with a preloaded force.

Once installed on the drive shaft 38, the fastener(s) 208 hold the axial position of the thrust plate 206 against the cone portion 202, and the cone portion 202 is thus wedged by the fastener(s) 208 between the rotor hub 58 and the drive shaft 38. The thrust plate 206 may be configured to withstand high axial force from the fastener(s) 208, to promote spreading of the axial force between the fastener(s) 208 and the cone portion 202 and to prevent damage to the cone portion 202 at locations adjacent the fastener(s). In the illustrated embodiment, the connecting surface 204 and fastener 208 are configured to be tightened upon receipt of an axial force in the upward direction +RA from generation of a creep force between the inner race 82 and the drive shaft 38.

While illustrated in FIG. 2 and described herein with regard to connection of a single rotor hub (i.e., the lower rotor hub 58) with the drive shaft 38, the rotor assembly 26 may include similar features to secure another rotor hub (i.e., the upper rotor hub 66) to different or the same drive shaft 38. In other words, the rotor assembly 26 may include a second cone portion 202, connecting surface(s) 204, thrust plate 206, fastener(s) 208, hub spline(s) 250 and shaft spline(s) 254 to similarly secure the upper rotor hub 66 (i.e., a second rotor hub including a second inner surface 134) to the drive shaft 38.

Figure 8A:
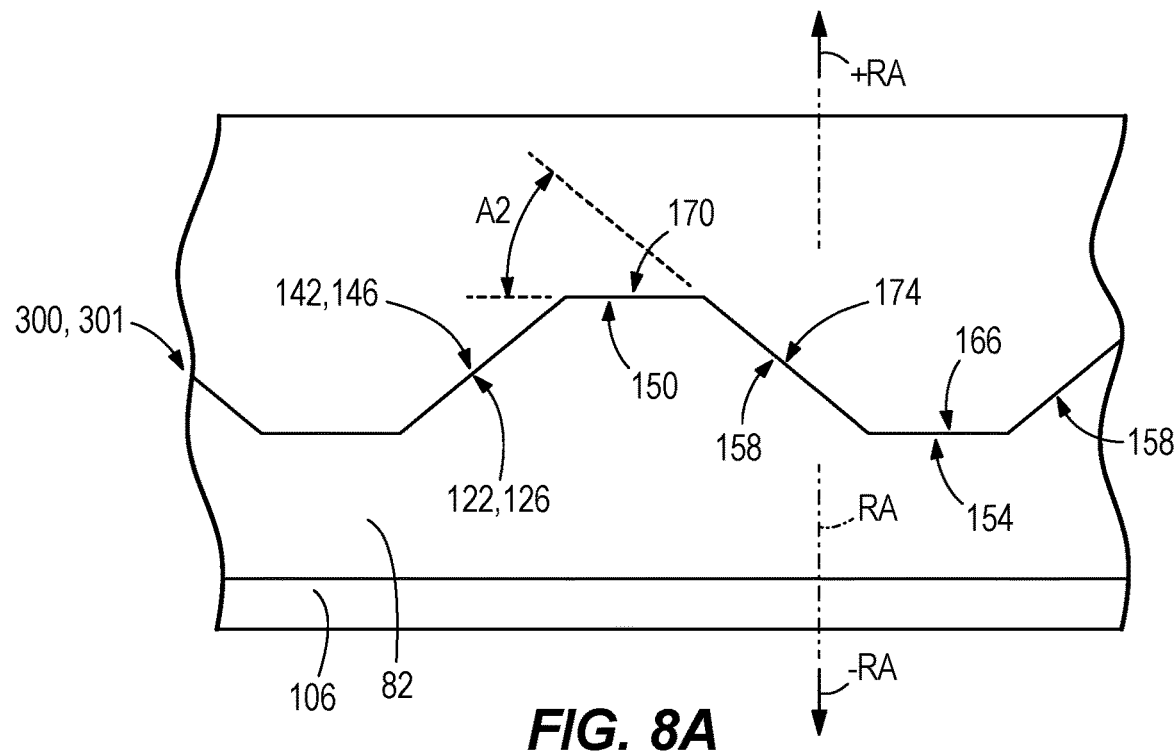
FIG. 8A depicts an alternate trapezoidal bearing anti-creep interface.
Figure 8B:
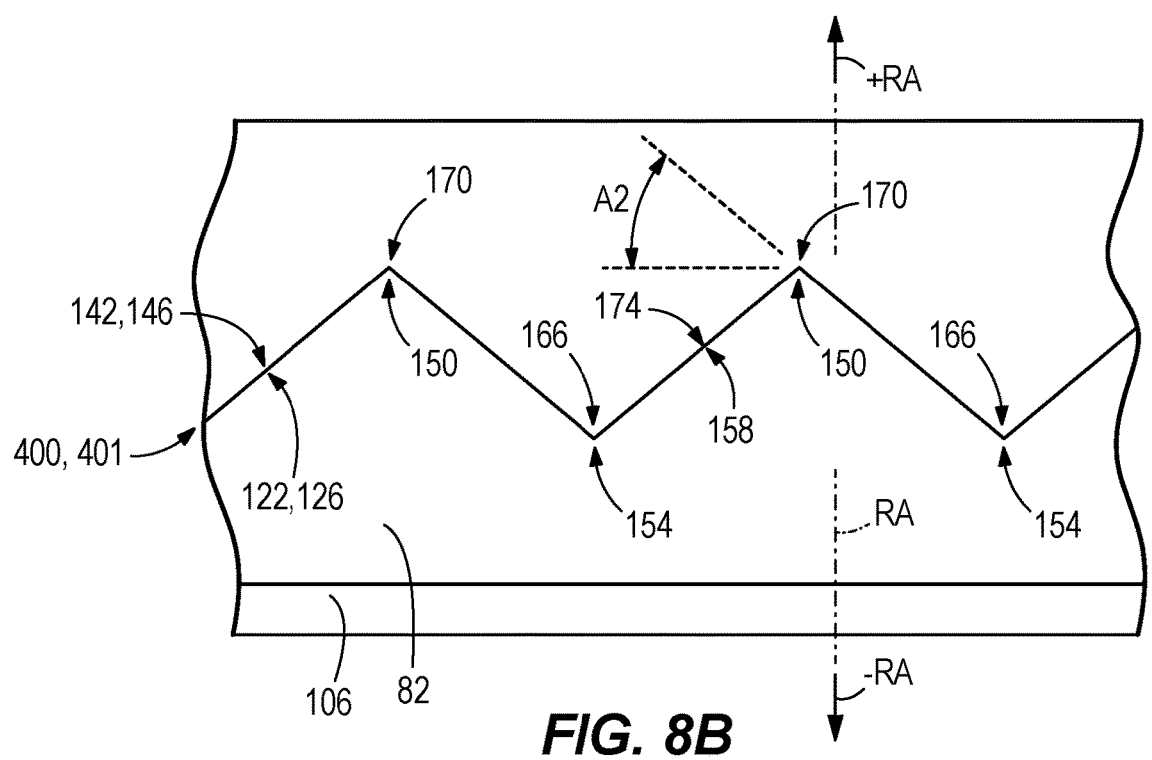
FIG. 8B depicts an alternate zigzag bearing anti-creep interface.
Figure 8C:
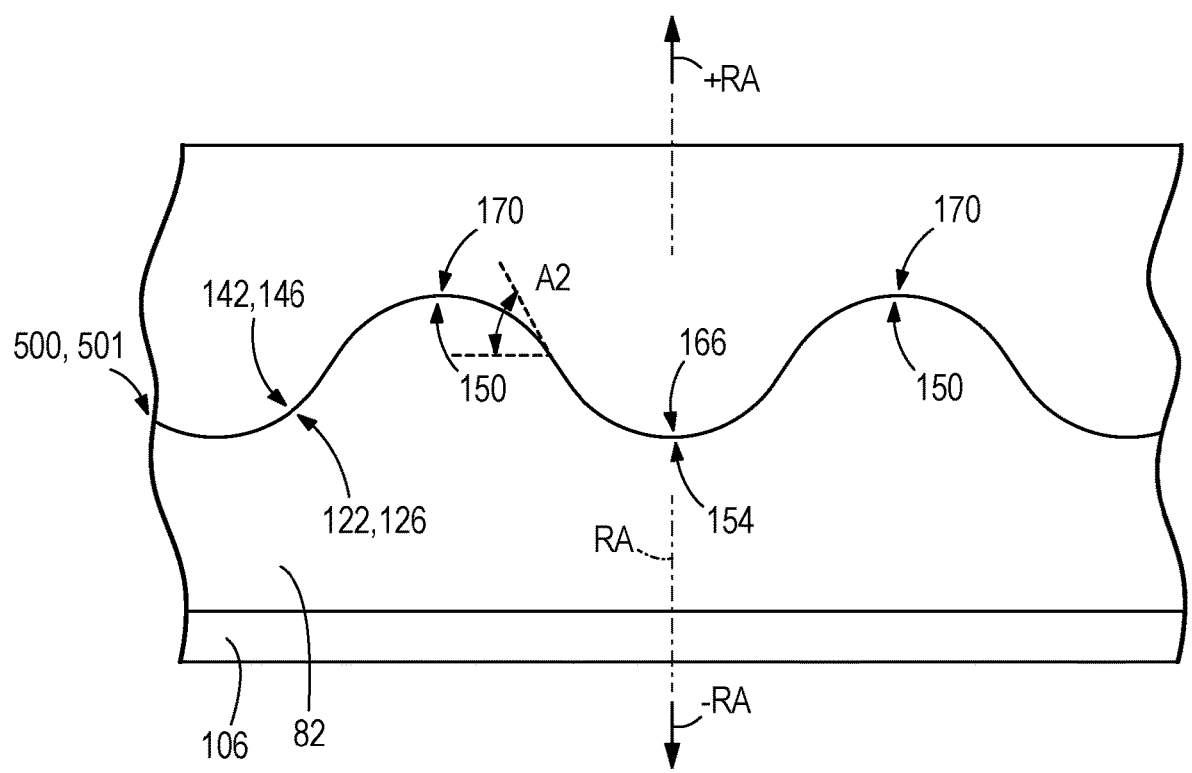
FIG. 8C depicts an alternate curved bearing anti-creep interface.

FIG. 8A-8C illustrate exemplary alternative geometries of the interlocking joint 74. In the embodiment depicted in FIG. 8A, a trapezoidal interlocking joint 300 (an interface that transfers rotational creep force to axial force) includes peaks 150, 166 and valleys 154, 170 which each include chamfered surfaces. The chamfer surfaces of the peaks 150, 166 and valleys 154, 170 of the trapezoidal interlocking joint 300 extend in a direction perpendicular to the rotational axis RA. Transition portions 158, 174 of the interlocking joint 300 are oriented along an angle A2 which is generally similar to the angle A1, and provided in both directions (e.g., the upward direction +RA; and the downward direction −RA).

In the embodiment depicted in FIG. 8B, a zigzag interlocking joint 400 (an interface that transfers rotational creep force to axial force) includes peaks 150, 166 and valleys 154, 170 that terminate at points. Transition portions 158, 174 of the zigzag interlocking joint 400 are oriented along an angle A3, which is generally similar to the angle A1, and provided in both directions (e.g., the upward direction +RA; and the downward direction −RA). In the zigzag interlockingjoint 400, the transition portions 158, 174 converge at points represented by the peaks 150, 166 and valleys 154, 170. The peaks 150, 166 and valleys 154, 170 of the zigzag interlocking joint 400 are devoid of curves and/or chamfer surfaces as in the interlockingjoint 74 and the trapezoidal interlockingjoint 300.

In the embodiment depicted in FIG. 8C, a curved interlocking joint 500 (an interface that transfers rotational creep force to axial force) includes peaks 150, 166 and valleys 154, 170 connected to one another without transition portions 158, 174. The curved interlocking joint 500 is devoid of any sharp transitions between peaks 150, 166 and valleys 154, 170. As discussed above with regard to the interlockingjoint 74 of FIGS. 3 and 6-7, differing circumferential spacing, and optimized geometries of peaks 150, 166 and valleys 154, 170 of the trapezoidal interlocking joint 300, zigzag interlocking joint 400, and/or curved interlocking joint 500 may be present in other embodiments. Other geometrically shaped interlockingjoints are also possible.

During assembly, the bearing 78 is pressed onto the drive shaft 38 (e.g., by a first press fit) until the first axial end surface 118 of the inner race 82 abuts the shoulder 106 of the drive shaft 38. The retaining element 102 may, at any time after the bearing 78 is in position, secure the outer race 86 (e.g., a second race) of the bearing 78 to the gearbox 34 (or any other fixed component). Similarly, at any time after the bearing 78 is in position, the lower rotor hub 58 may be pressed onto the drive shaft 38. During or prior to pressing the lower rotor hub 58, the low cone portion 130 may be radially aligned such that peaks 150 of the inner race 82 align with valleys 170 of the low cone portion 130, and vice versa. The lower rotor hub 58 is pressed onto the drive shaft 38 (e.g., by a second press fit) until the low cone portion 130 engages the inner race 82. When the lower rotor hub 58 is fully pressed on the drive shaft 38, the peaks 150, 166 and valleys 154, 170 of the lower rotor hub 58 and low cone portion 130 are loaded in compression (e.g., in an axial direction parallel to the rotational axis RA) with one another. In the illustrated embodiment, the cone portion 202 of the upper rotor hub 66 is installed after pressing of the lower rotor hub 58 onto the drive shaft 38. Optionally, the cone portion 202 is pressed onto the drive shaft 38 (e.g., by a third press fit) until the cone portion 202 is received in a void 203 defined by the angled inner surface 200. The void 203, more specifically, being positioned radially between the lower rotor hub 58 and the drive shaft 38. When the cone portion 202 is located in the void 203, the connecting surface 204 with the pre-installed fastener(s) 208 is secured loosely to the drive shaft 38. With the connecting surface 304 in position, the pre-installed fastener(s) 208 can be tightened (e.g., by applying a torque thereto) to a loaded force greater than the preloaded force to secure the axial position of the lower rotor hub 58 (e.g., by the cone portion 202) to the drive shaft 38.

In operation, the power source 30 is activated, causing the gearbox 34 to rotate the drive shaft 38. Upon rotation of the drive shaft 38, torque is transmitted via the hub splines 250 and shaft splines 254 to at least the lower rotor hub 58 to rotate the blades 70 and generate resultant lift and/or thrust force. As the power source 30 increases in speed, the inner race 82 of the bearing may realize a creep force in a creep direction CD. The creep force is directed circumferentially about the drive shaft 38. As the inner race 82 realizes the creep force, the inner race 82 provides a pressing force F1 through the interlocking joint 74 to the low cone portion 130. The pressing force F1 includes a component F3 in a direction normal to RA (FIG. 3) extending along the creep direction CD (FIGS. 2, 3), and a component F2 (FIG. 3) in a direction parallel to RA extending in the upward direction +RA. The pressing force F1 is angled relative to the rotational axis RA in a direction generally normal to the transition portions 158, 174, as provided by the angle A1. The transition portions 158, 174 of the interlocking joint 74 transmit a portion of the creep force to the low cone portion 130, and the press fit between radial inner surface 134 of the low cone portion 130 and the drive shaft 38 may assist the inner race 82 in counteracting the horizontal component F3 of the pressing force F1 to resist creep of the inner race 82 relive to the drive shaft 38. Depending on the angle A1, the vertical component F2 may be larger than the horizontal component F3.

While creep force is realized, the inner race 82, the transition portions 158, 174 of the interlocking joint 74 also transmit the component F2 of the pressing force F1 to the connecting surface 204 and the fastener 208. Upon receipt of the component F2, the connecting surface 204 and fastener 208 counteract the component F2, and are tightened upon the lower rotor hub 58. More specifically, the fastener 208 is tightened to a creep counteracting force greater than the loaded force of the fastener 208. This enhances security of the connection between the one of the lower rotor hub 58 and the drive shaft 38. In sum, at least a portion of the creep force (e.g., corresponding with the component F2) of the inner race 82 can effectively be reoriented (e.g., redirected) as an axial force to tighten the connecting surface 204 and the fastener 208 on the at least one of the lower rotor hub 58 upon generation of a creep force between the inner race 82 and the drive shaft 38. At least a portion of the creep force (e.g., corresponding with the component F3) can effectively be shared between both press fits between the radial inner surface 110 of the inner race 82 (e.g., the first press fit) and the drive shaft 38 as well as between the radial inner surface 134 of the low cone portion 130 and the drive shaft 38 (e.g., the second press fit).

Magnitudes of the creep force and corresponding pressing force F1 may change throughout operation of the aircraft 10. For example, as the power source 30 rotates faster, creep force realized by the inner bearing 82, and the corresponding pressing force F1 may increase. However, the inner bearing 82 will be inhibited from creeping movement along the creep direction CD relative to the drive shaft 38 by the interlocking joint 74 and the low cone portion 130. This is especially helpful because as the power source 30 rotates faster, creep is more likely. As the power source 30 rotates slower, creep force realized by the inner bearing 82, and the corresponding pressing force F1 may decrease.

The interlockingjoint 74 provides a plurality of advantages over known rotor systems. The interlockingjoint 74 utilizes generally conventional dual rotor hub geometries and makes minor changes to them to provide dual benefit of mechanically inhibited creep and rotor hub tightening. The interlockingjoint 74 provides a mechanically self-tightening joint which prevents rotational creep of the inner race 82 about the drive shaft 38. In contrast, known systems including slots and tabs are bound together by forces securing the slots to the tabs without being self-tightening. Such slot and tab interfaces also provide points of relatively high stress concentration adjacent the slots and tabs. In contrast, the interlockingjoint 74 is provided within a compact design envelope (e.g., volumetrically), and the interlocking joint 74 has relatively low weight (e.g., the weight of the additional material in the inner race 82 and the low cone portion 130 required to form the interlocking joint 74) in comparison with other known anti-creep systems (e.g., increasing force of the first press-fit and/or the second press-fit would require increasing drive shaft 38 thickness R2-R1, resulting in increased weight of the drive shaft 38). For monitoring the effectiveness of the interlockingjoint 74, the interlocking joint 74 (e.g., by the radial outer surfaces 114, 138) may be made visible from the exterior of the aircraft 10. The interlocking joint 74 further may provide high redundancy devoid of high stress concentration points by providing a high quantity of peaks 150, 166 and valleys 154, 170, and large amount of surface area contact between the bearing race interface surface 126 and the hub interface surface 146 (e.g., at each of the transition portions 158, 174, which together act as a multi-wedge contact area). In the event that one of the peaks 150, 166, valleys 154, 170, or transition portions 158, 174 is worn or otherwise damaged, the remainder of the peaks 150, 166, valleys 154, 170, and transition portions 158, 174 are capable of transmitting the creep force to the low cone portion 130.

While embodiments disclosed herein primarily refer to a rotor assembly 26 for an aircraft, similar interlocking joints 74, 300, 400, 500 (functioning as torque transmission interfaces 75, 301, 401, 501) may be implemented in assemblies which are not aircraft. For example, land and/or water supported vehicles, or other non-vehicular apparatus may employ similar interlocking joints 74, 300, 400, 500. Similarly, while the embodiments disclosed herein primarily refer to dual rotor aircraft 10 including a lower rotor hub 58 and an upper rotor hub 66, the interlocking joints 74, 300, 400, 500 may be modified for use in single rotor hub assemblies (e.g., only including a lower rotor hub 58).

Various features and advantages of the embodiments described herein are set forth in the following claims.

What is claimed is:
1. A bearing anti-creep interface comprising:
 a drive shaft extending along a rotational axis;
 a bearing race having an inner surface press-fit onto the drive shaft and an axial end surface defining a bearing race interface surface;
 a hub having an inner surface rotationally coupled to the drive shaft and an axial end surface defining a hub interface surface,
 wherein the hub interface surface is in contact with the bearing race interface surface to form an interlocking joint, the interlocking joint is configured to transfer rotational creep force of the bearing race about the rotational axis and relative to the drive shaft into an axial pressure force applied to the hub in a direction parallel with the rotational axis.

2. The bearing anti-creep interface of claim 1, wherein one of the bearing race interface surface and the hub interface surface includes a peak and the other of the bearing race interface surface and the hub interface surface includes a valley, the peak and the valley extending along a direction parallel with the rotational axis and forming the interlocking joint.

3. The bearing anti-creep interface of claim 1, wherein each of the bearing race interface surface and the hub interface surface includes a plurality of peaks and a plurality of valleys each extending along a direction parallel with the rotational axis and forming the interlocking joint.

4. The bearing anti-creep interface of claim 3, further comprising a plurality of transition portions between the peaks and the valleys.

5. The bearing anti-creep interface of claim 4, wherein the transition portions are angled relative to a horizontal reference plane perpendicular to the rotational axis.

6. The bearing anti-creep interface of claim 3, wherein at least one of the peaks includes a chamfer forming an axial gap between the at least one peak and the corresponding valley in a direction parallel to the rotational axis exists between the bearing race interface surface and the hub interface surface.

7. The bearing anti-creep interface of claim 1, wherein the bearing race interface surface and the hub interface surface each form a bidirectional contact surface such that the hub opposes rotational creep force in a first rotational direction about the rotational axis and/or an opposite second rotational direction about the rotational axis.

8. The bearing anti-creep interface of claim 1, wherein the hub interface surface is loaded in compression with the bearing race interface surface.

9. An aircraft comprising:
an airframe;
a power source configured to generate power;
a gearbox coupled to the power source and a drive shaft, the drive shaft extending along and rotatable about a rotational axis according to the generated power transmitted through the power source; a bearing race having a bearing race inner surface secured to the drive shaft by a press-fit, the bearing race having a bearing race interface surface with a transition portion that is angled with respect to a horizontal reference line extending perpendicular to the rotational axis;
a rotor hub having a hub inner surface secured to the drive shaft by intermeshing splines, the rotor hub having a hub interface surface with a hub transition portion complementary to the transition portion of the bearing race;
a plurality of blades coupled to the rotor hub and configured to produce at least one of thrust or lift according to a rotation of the drive shaft;
wherein the bearing race interface surface and the hub interface surface engage one another to form an interlocking joint configured to counteract rotational creep force of the bearing race relative to the drive shaft.

10. The aircraft of claim 9, wherein the drive shaft includes a shoulder extending radially outwardly from the shaft, the bearing race including an axial end surface that contacts the shoulder.

11. The aircraft of claim 9, further comprising a blade coupled to the rotor hub.

12. The aircraft of claim 9, further comprising a second bearing race and a roller between the bearing race and the second bearing race, the second bearing race being fixed relative to the airframe.

13. The aircraft of claim 12, wherein the second bearing race is fixed relative to the gearbox.

14. The aircraft of claim 9, further comprising a fastener that, in addition to the second press fit, axially secures the position of the rotor hub to the drive shaft.

15. The aircraft of claim 14, wherein the fastener is configured to be tightened upon generation of a creep force between the bearing race and drive shaft.

16. The aircraft of claim 14, wherein the fastener is configured to be tightened upon generation of a creep force between the bearing race and the drive shaft.

17. A bearing race comprising:
a body that is generally annularly shaped about a rotational axis, the body defining a first axial end and an opposite second axial end, the second axial end comprising
an outer radial surface,
an inner radial surface closer to the rotational axis than the outer radial surface, the inner radial surface, and
an interface surface functioning as part of an interlocking joint, the interface surface shaped with at least one peak and at least one valley having variable height with respect to the first axial end in a circumferential direction about the rotational axis,
wherein the inner radial surface and the interface surface converge at a shared edge with the at least one peak and the at least one valley configured to form a portion of the interlocking joint and to contribute to a press fit.

18. The bearing race of claim 17, further comprising at least one transition portion between the peak and the valley, the transition portion being generally planar and angled with respect to a horizontal reference line perpendicular to the rotational axis.

19. The bearing race of claim 17, wherein the interface surface is shaped with at least two valleys and at least two transition portions, each transition portion positioned between the peak and one of the at least two valleys, the at least two transition portions form a bidirectional contact surface.

20. The bearing race of claim 17, wherein the at least one of the peak and the valley includes a curved surface with variable height relative to the first axial end.

* * * * *